United States Patent

[11] 3,613,017

[72] Inventor Joseph A. Howells
Moorestown, N.J.

[21] Appl. No. 819,708
[22] Filed Apr. 28, 1969
[45] Patented Oct. 12, 1971
[73] Assignee Science Accessories Corporation
Southport, Conn.

[54] LOGIC CIRCUIT
4 Claims, 4 Drawing Figs.

[52] U.S. Cl. .......... 328/207,
307/215, 307/273, 307/276, 307/293, 328/206
[51] Int. Cl. .......... H03k 3/10,
H03k 3/12, H03k 17/30
[50] Field of Search .......... 307/273,
272, 293, 269, 291; 328/207, 74, 73

[56] References Cited
UNITED STATES PATENTS 3,200,340 8/1965 Dunne .......... 307/269
3,497,725 2/1970 Lorditch, Jr. .......... 307/273

*Primary Examiner*—Donald D. Forrer
*Assistant Examiner*—L. N. Anagnos
*Attorney*—Frank R. Trifari

ABSTRACT: A monostable multivibrator circuit for producing a pulse of a fixed duration including a first D-type flip-flop having set, reset, clock and delay inputs, and a second D-type flip-flop having set, reset, clock and delay inputs. A trigger pulse triggers a change in state of the first D-type flip-flop, in turn causing a change in state in the second D-type flip-flop. The output of the second D-type flip-flop contains a capacitor storage circuit which serves to bypass the change in state of the second D-type flip-flop for a predetermined delay time, and feedback an exponentially increasing level to the first D-type flip-flop. When the charge across the capacitor reaches the threshold level of the first D-type flip-flop, the first flip-flop output again changes condition, causing the second output to change correspondingly.

PATENTED OCT 12 1971 3,613,017

| A | B | | C |
|---|---|---|---|
| 0 | 0 | | 1 |
| 0 | 1 | | 1 |
| 1 | 0 | | 1 |
| 1 | 1 | | 0 |

INVENTOR.
JOSEPH A. HOWELLS

BY

Frank R. Trifari
AGENT

LOGIC CIRCUIT

This invention relates to a monostable pulse generator, and more particularly to a monostable pulse generator employing logic elements.

The use of integrated circuits for monostable multivibrators present advantages in economy and ease of assembly. However, when comparatively long pulse lengths are required from a monostable circuit, for example, up to microseconds and milliseconds in duration, difficulty is encountered. The reasons for such difficulty arise due to time constants which are lengthy and shallow, allowing the voltage input to an integrated circuit gate to approach the transition region of switching level too slowly and thereby cause multiple pulsing at the output.

It is therefore the principal object of the present invention to provide an integrated circuit arrangement which can be employed as a monostable multivibrator offering pulse lengths longer than heretofore obtainable.

It is the secondary object to the present invention to provide a monostable multivibrator offering pulse lengths longer than heretofore obtainable with a minimum of external components.

In accordance with the foregoing objects, the present invention employs first and second bistable circuits each having a first input for switching the state of the bistable circuit in response to a shift in level in excess of the threshold level on the input in a first direction, and a second input for switching the state of the bistable circuit in response to a shift level on the second input in a second direction. Application of a trigger pulse in the second direction to the second input of the first bistable circuit results in the output of the first bistable circuit responding thereto by shifting its output level in the first direction. This first bistable circuit output is applied to the first and second input of the second bistable circuit, and the output of the second bistable circuit responds to the first direction level shift on the first bistable circuit output for shifting the level on the output of the second bistable circuit in the first direction. The second bistable circuit has coupled to the output thereof a storage device responsive to the shift in level on the output of the second bistable circuit for producing a level thereacross which increases over a time period in the first direction. This increasing level is coupled back to the first input of the first bistable circuit and, when the threshold level of this feedback signal is exceeded by the increase in the level of the feedback signal, the output of the first bistable circuit undergoes a shift in level in the second direction. Since the second direction is now applied to the first and second input of the second bistable circuit, the second bistable circuit undergoes a change in output condition back to its initial level. Each of these bistable circuits can be D-type flip-flop, each having a clock input, set input, reset input and a delay input. The delay and reset inputs of each circuit are clamped, and the first and second inputs are the clock and set inputs respectively. The storage means may include a capacitor alone or in combination with a resistor series connected between a point of potential and a reference point, with the second bistable circuit output being connected with the junction of the resistor and capacitor.

The foregoing objects and brief description of the present invention will be more apparent with reference to the following more detailed description and the appended drawings wherein.

Figure 1:
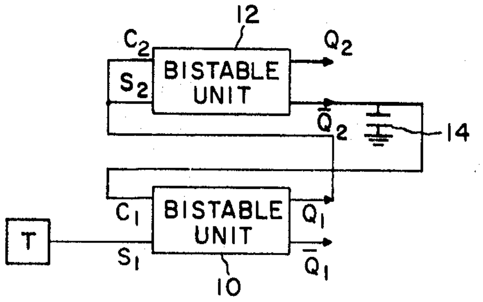
FIG. 1 is a general block diagram of the inventive concept herein.

Referring now to FIG. 1 there is shown a first bistable unit 10, a second bistable unit 12, each of these bistable units having inputs $S_1$, and $C_1$, and $S_2$, and $C_2$, respectively. Each of the bistable units 10 and 12 have outputs designated Q and $\overline{Q}$ with an appropriate reference number, the output Q being the complement of the output $\overline{Q}$ in each case. As shown in the FIG. 1, the output $Q_1$ of the bistable circuit is coupled to the inputs $S_2$ and $C_2$ of the bistable unit 12. Further, the output $\overline{Q}_2$ of the bistable unit 12 is coupled to the input $C_1$ of the bistable unit 10. A capacitor 14 is connected between output $\overline{Q}_2$ of the bistable unit 12 and a reference point illustrated as ground.

Figure 2:
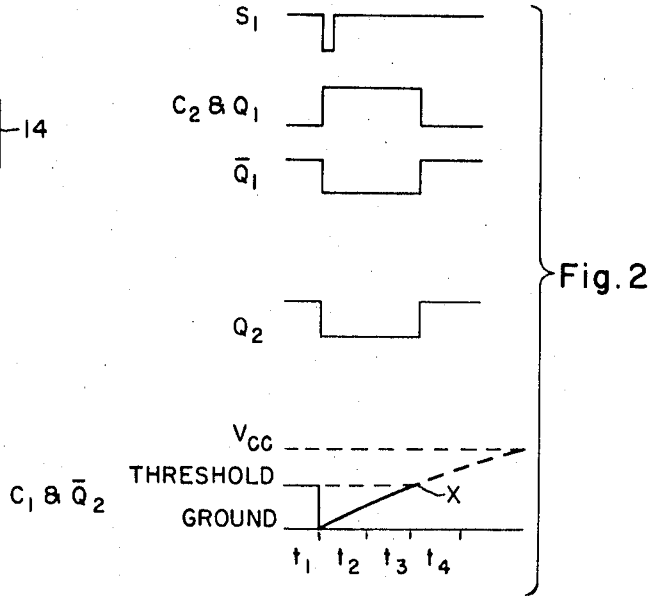
FIG. 2 is a graphical relationship of the waveforms at various points of FIG. 1.

To properly understand the invention, it is important to note the bistable units 10 and 12 have certain defined characteristics of operation. More particularly, the bistable unit 10 and 12 will undergo a change in state only when a signal level on the inputs to the $S_1$ and $S_2$ terminals of either unit undergoes a transition from a high level to a low level, or as may more conventionally be described, from a one to a zero. The reverse is true, however, with respect to the C inputs. That is, the C input is operative to switch the bistable unit only when the input level thereon shifts from a low level to a high level. Thus, the operation of the units 10 and 12 as illustrated in FIG. 1 can be efficiently described with reference to the waveform diagrams of FIG. 2. As shown in FIG. 2 the condition of the bistable units 10 and 12 are such that during the initial period $t_1$ the output $Q_1$ of the bistable unit 10 is assumed to be in its low condition, whereas the output $Q_2$ is assumed to be in the high position. The complimentary output of the bistable unit 12, $\overline{Q}_2$, is therefore in the low condition. Toward the end of the time period $t_1$, the signal level on the input line $S_1$ is driven toward the low condition by a suitable external source T as for example conventional logic circuitry and representing a trigger pulse. As a result of this, the output $Q_1$ undergoes a level change from the low condition to the high condition. Since the output $Q_1$ is coupled to the input $C_2$ of the bistable unit 12, a similar change in the output $Q_2$ also takes place. The corresponding complementary change in the output $\overline{Q}_2$ also takes place, resulting in the signal level proceeding in a direction from low to high at the output $\overline{Q}_2$. The presence of the capacitor at the output of $\overline{Q}_2$ will shunt the leading edge of the waveform produced by $\overline{Q}_2$ to the indicated ground point such that the signal level at the input $C_1$ at the end of the period $t_1$ will proceed from the high level to the low level and during the period $t_2$–$t_3$ will undergo a rise to a threshold point. This threshold point is the point at which the signal level appearing on $C_1$ becomes sufficient to cause the bistable unit 10 to undergo a change in state. The time period necessary to achieve threshold is selectable in a well known and conventional manner employing the exponential characteristic of a capacitor. However, the capacitor is only indicative of the many known types of storage devices usable for time delay. When the threshold point, indicated in FIG. 2 as X, is achieved, the output level $Q_1$ returns from the high level to the low level. Since the output of $Q_1$ is coupled to the input $S_2$ of the bistable unit 12, the shift from a high level to a low level on $S_2$ changes the condition of the bistable unit 12 and the bistable unit 12 will achieve its initial condition. This is indicated during the time period $t_4$ FIG. 2. Since the arrangement in FIG. 1 utilizes separate gating switching inputs for effecting the change of state of the bistable units 10 and 12, an accurate time delay period over a relatively long region can be achieved without cause for concern of transitions appearing due to the shallow rise of the time delay circuit with respect to the threshold in which the associated flip-flop switches.

Figure 4:
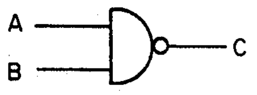
Figure 3:
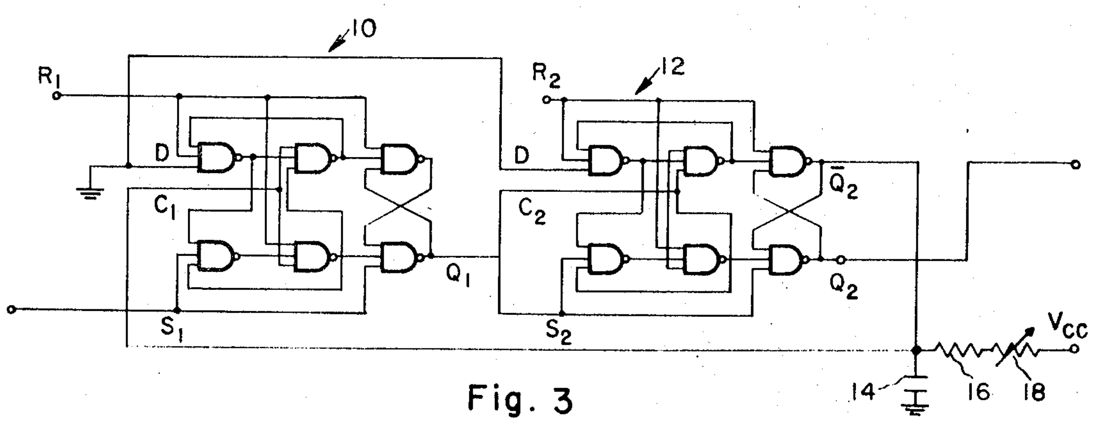
FIG. 3 is a more detailed illustration of the logic circuitry involved in each of the bistable circuit units described in FIG. 1, and FIG. 4, a detail of FIG. 3.

Referring now to FIG. 3, a more detailed arrangement of the circuit of FIG. 1 is presented. Each of the gates indicated therein are NAND gates, of conventional design. Corresponding legend numerals have been used in FIG. 3 to indicate correspondence with FIG. 1. Thus, each of the bistable units 10 and 12 are constructed of six NAND gates, arranged as shown, to produce the functions as stated in connection with FIG. 1. The operation of a NAND gate is illustrated in the logic tables of FIG. 4. The logic circuit performs the function of an AND gate with an inverting function, so that the output appearing at C is the inverted product of the input supply to A and B, as indicated in the logic table in FIG. 4.

For the purposes of increasing the angle with which the capacitor charge approaches the threshold value of the input $C_1$ of the bistable unit 10, a resistance 16 is connected between the capacitor 14 and a source of potential V*cc* which, as indicated in FIG. 2, is in excess of the threshold value, and represents the value to which the capacitor level will charge before being clamped to the threshold level at the input $C_1$. An additional resistance 18, which may be variable, is added for the purposes of trimming the value of 16 and for adjusting the values of the time constants and the resultant pulse width.

The units 10 and 12 are each conventionally available and both obtainable together in a single structural environment, such as for example the SN7474N Integrated Circuit, a dual type D flip-flop, manufactured by Texas Instruments.

When utilizing the foregoing integrated circuit, the following pulse widths were obtained with the various stated values of R and C. The chart below is intended as exemplary only.

| $C_{14}$ | $R_{18}$=O | $R_{18}$=1KΩ | $R_{18}$=∞ ($R_{16}$=56Ω) |
|---|---|---|---|
| 1.5 UF | 1 US | 30 US | 40 US |
| 20 | 1 US | 450 US | 550 US |
| 100 | 0.2 MS | 2.8 MS | 3.5 MS |
| 200 | 0.5 MS | 5.5 MS | 6.5 MS |
| 300 | 0.7 MS | 8.0 MS | 9.0 MS |
| 400 | 0.9 MS | 9.0 MS | 10 MS |
| 500 | 1.1 MS | 9.8 MS | 16 MS |

As illustrated in FIG. 3, the reset terminals $R_1$ and $R_2$, although each may be operative to produce change in states of the bistable units 10 and 12, are not in fact utilized but rather are connected to a fixed reference point having a high-level value. The D inputs to each of the units 10 and 12, although also operable to change in condition of the bistable units, are similarly connected to a fixed reference point having a low-level value.

Since certain modifications and changes or alterations may be made in the above disclosed embodiment without departing from the scope of the invention here involved, it is intended that all matter contained in the above description and shown in the accompanying drawings shall be interpreted in an illustrative and not in a limited sense.

I claim:

1. A monostable pulse generator comprising first and second bistable circuits each having a first input for switching the state of said bistable circuit in response to a shift in level in excess of a threshold level on said first input in a first direction, and a second input for switching the state of said bistable circuit in response to a shift in level on said second input in a second direction, means for applying a trigger pulse in said second direction to the second input of said first bistable circuit, the output of said first bistable circuit responding to said trigger pulse for shifting the level thereon in said first direction, means applying said first bistable circuit output to said first and second input of said second bistable circuit, said second bistable circuit responsive to said first direction level shift of said first bistable circuit output for shifting the level of the output of said second bistable circuit in said first direction, capacitive storage means coupled to said second bistable circuit output and responsive to said shift in level thereon for producing an output level increasing exponentially over a time period in said first direction, and means coupling said storage means output level to the first input of said first bistable circuit, said first bistable circuit output undergoing a shift in level in said second direction as said level applied to said first input of said first bistable circuit exceeds said threshold level of said first bistable circuit, said second bistable circuit responsive to said latter shift in level through said second input thereof for restoring said second bistable circuit to its initial condition.

2. The combination of claim 1 wherein each of said bistable circuits are D-type flip-flops, each said first input being a clock input, each said second input being a set input, and each further including a delay input and a reset input, means connecting both said delay inputs to a first reference point, and means connecting both said reset inputs to a second reference point.

3. The combination of claim 1 wherein said storage means comprises a capacitor and resistor series connected between a point of potential and a reference point, and said second bistable circuit output is connected to the junction of said resistor and capacitor.

4. The combination of claim 2 wherein said storage means comprises a capacitor and resistor series connected between a point of potential and said reference point, and said second bistable circuit output is connected to the junction of said resistor and capacitor.